Jan. 30, 1962
V. STANZEL
3,018,585
REMOTELY POWERED PROPULSION AND CONTROL
MECHANISM FOR MODEL AIRCRAFT
Filed Feb. 28, 1958
2 Sheets-Sheet 1
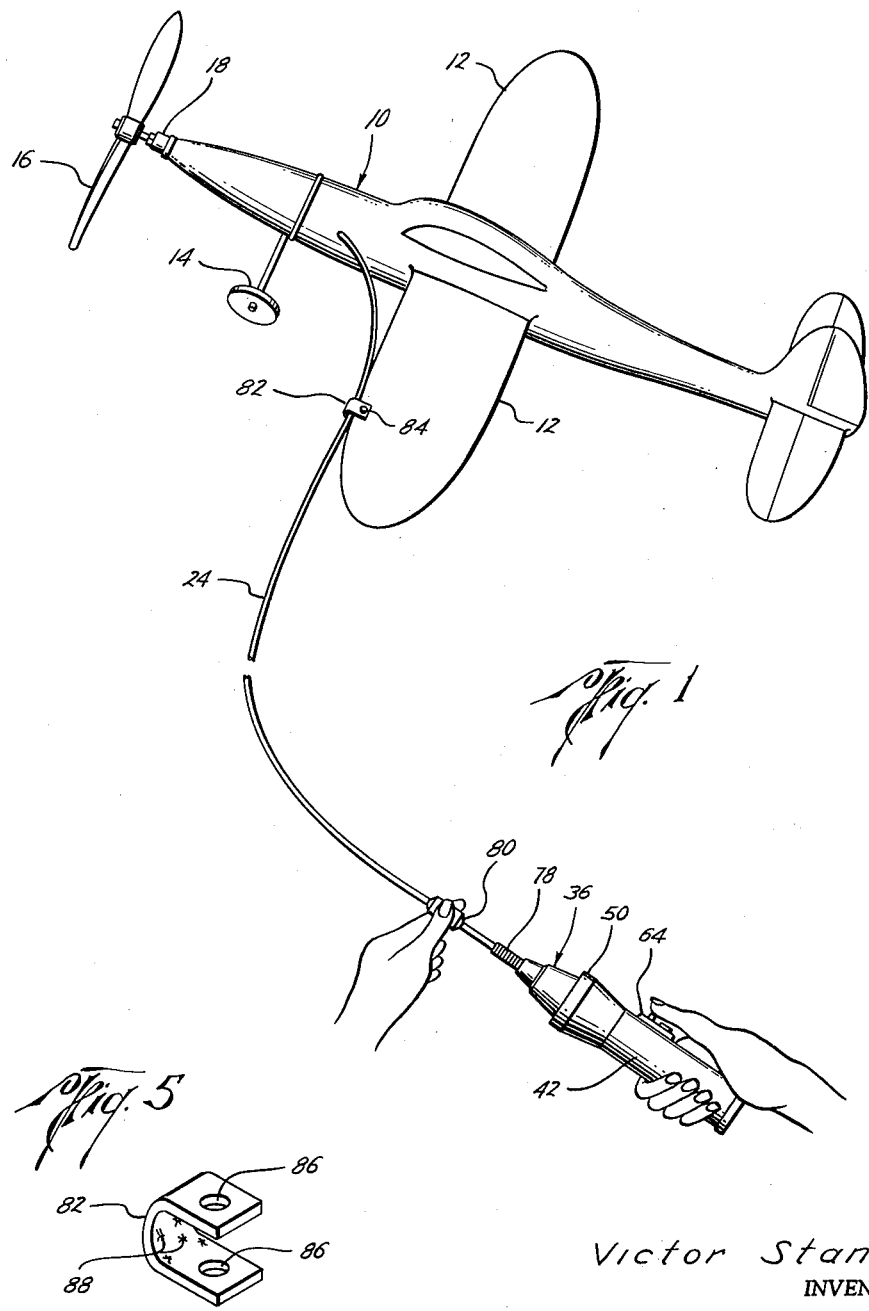
Victor Stanzel
INVENTOR.
BY Charles E. Lightfoot
ATTORNEY Jan. 30, 1962
V. STANZEL
3,018,585
REMOTELY POWERED PROPULSION AND CONTROL
MECHANISM FOR MODEL AIRCRAFT
Filed Feb. 28, 1958
2 Sheets-Sheet 2
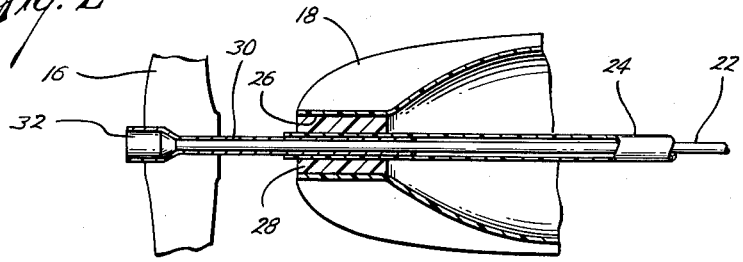
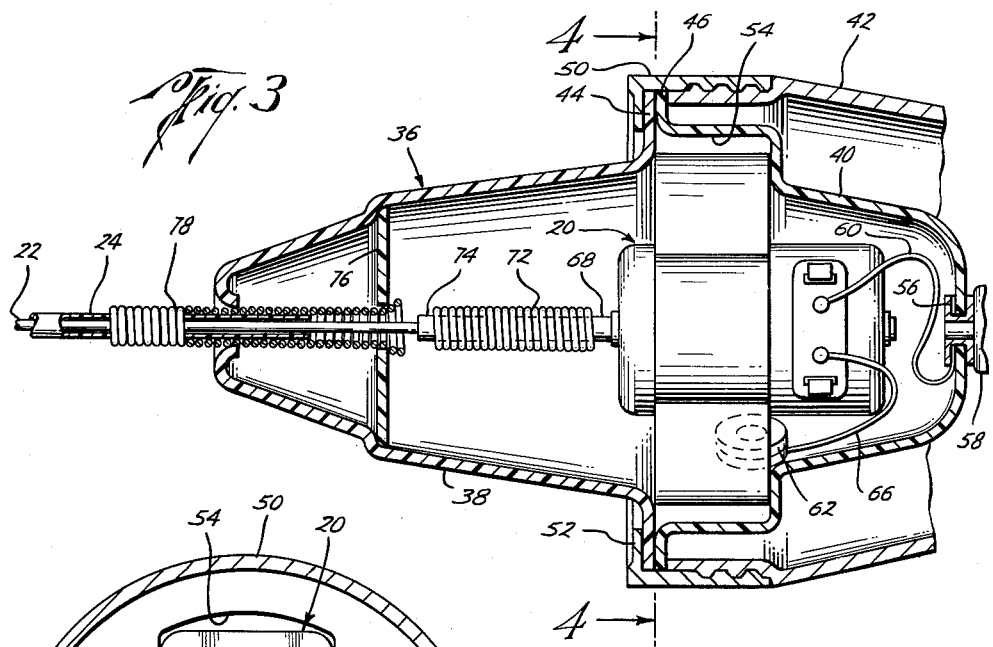
Victor Stanzel
INVENTOR.
BY Charles E. Lightfoot
ATTORNEY

United States Patent Office 3,018,585
Patented Jan. 30, 1962

3,018,585
REMOTELY POWERED PROPULSION AND CONTROL MECHANISM FOR MODEL AIRCRAFT
Victor Stanzel, P.O. Box 171, Schulenburg, Tex.
Filed Feb. 28, 1958, Ser. No. 718,254
6 Claims. (Cl. 46—77)

This invention relates to propulsion and control mechanism for model aircraft and more particularly to mechanism to control the movements of the airplane while the same is in flight by which power may be transmitted to a model airplane to drive the same and to control the movements of the airplane in flight from a location at a distance therefrom.

Heretofore it has been customary to operate model aircraft by means of rubber band motors, high speed internal combustion engines, or the like, mounted directly on the craft. When operated by such means the movements of the craft in flight are very difficult to control, it being usually necessary to permit the airplane to follow a course for which it has been previously adjusted. Various devices have been proposed, such as control lines or radio control mechanism, for remotely controlling the speed of model aircraft propelled by engines mounted on the craft, but heretofore no satisfactory method has been found whereby such craft could be powered and controlled from a distance.

Moreover, it has not been feasible to operate model aircraft by the use of electrical power due to the relatively great weight of the motor and electrical power supply source required.

The present invention has for an important object the provision of electrically powered propulsion mechanism for model aircraft wherein the electric motor and power supply therefor is located at a distance from the craft so that the weight of such mechanism does not affect the craft in flight.

Another object of the invention is to provide an electrically powered model aircraft of sufficiently light weight to allow the craft to be aerodynamically self supporting by its own wings at relatively low forward speeds and which may be operated by electrical power from a source remote from the craft.

A further object of the invention is the provision of an electrically powered model aircraft which is operated by an electric motor and power supply source located at a distance from the craft and drivingly connected thereto by means of a flexible shaft.

Another object of the invention is to provide an electrically powered model aircraft which is operated by an electric motor and power supply source located at a distance from the craft and including flexible cable means for transmitting power from the motor to the craft and means responsive to the speed of the motor for controlling the movements of the craft in flight.

A further object of the invention is the provision in an electrically powered model aircraft operated by an electric motor located at a distance from the craft of means for manually controlling the movements of the craft in flight.

Another object of the invention is to provide an electrically powered model aircraft which is adapted to be operated by an electric motor located at a distance from the craft and embodying flexible cable powered transmitting means forming a driving connection between the motor and the propeller of the craft and a flexible tubular element enclosing the cable and connected to the craft in a manner to permit the movements of the craft in flight by regulating the speed of the motor or by manual manipulation of the tubular element.

A still further object of the invention is the provision of an electrically operated model aircraft of simple and economical construction, which is easily controlled in flight and in which the power consumed in operation is low.

The above and other important objects and advantages of the invention may best be understood from the following detailed description, constituting a specification of the same when considered in conjunction with the annexed drawings, wherein:

FIGURE 1 is a perspective view illustrating a preferred embodiment of the propulsion and control mechanism of the invention and showing the manner in which the same is used in propelling and controlling the flight of a model aircraft;

FIGURE 2 is a central, longitudinal, cross-sectional view, on an enlarged scale, illustrating a portion of the front end or nose of a model aircraft and the propeller of the same and showing details of the construction and means of connection of the driving mechanism therefor in accordance with the invention;

FIGURE 3 is a central, longitudinal, cross-sectional view, on an enlarged scale, illustrating a preferred embodiment of the electric motor of the propelling and control mechanism of the invention and showing details of construction of the flexible drive mechanism and the manner in which the same is connected and operated;

FIGURE 4 is a cross-sectional view, taken along the line 4—4 of FIGURE 3, looking in the direction indicated by the arrows, and FIGURE 5 is a perspective view on an enlarged scale of one form of means by which the control mechanism of the invention is attached to the aircraft, such means being shown separated from the surrounding parts of the structure.

Referring now to the drawings in greater detail, the invention is illustrated in connection with its use in the propulsion and control of a model airplane of conventional construction having a hollow body or fuselage 10, provided with wings 12, landing gear 14 and a propeller 16 rotatably mounted at the forward end or nose 18 of the craft. The airplane is also provided with a tail structure having the usual stabilizers 13 and rudder 15.

The airplane is preferably of very light construction intended to be aerodynamically self supporting at relatively low air speeds, and for this reason it is not feasible to mount the driving mechanism for the propeller 16 on the plane itself.

The driving mechanism for the propeller 16 comprises an electric motor 20 which is connected by means of a flexible cable or wire 22 enclosed in a flexible tube 24 to the propeller. For this purpose the nose 18 of the airplane is formed with an end opening 26 within which a tubular plug 28 is fitted through which the outer end of the tube extends and to which the tube is anchored. The propeller 16 is preferably of molded construction, formed of plastic, and has a tubular shaft 30 molded into and forming a hub for the propeller which is rotatably extended into the outer end portion of the tube 24.

The flexible cable 22 extends at its outer end beyond the end of the tube 24 and through the tubular shaft 30 which is flattened at its outer end, as seen at 32, to securely connect the shaft to the cable for rotation therewith and to form a secure connection between the cable and the propeller to cause the propeller to be rotated by the cable. By this construction the outer end portion of the flexible tube 24 extending through the plug 26 forms a bearing for the shaft 30 and by forming the flexible tube of suitable material, such as nylon, or the like, a bearing for the propeller having very low friction characteristics is provided.

The motor 20 is mounted within a housing, generally indicated at 36, which may be conveniently formed in two sections 38 and 40 adapted to be assembled and removably attached to the front end of a casing such as the battery case 42, of a conventional flash light. For this purpose the sections 38 and 40 may be formed with external, annular, end flanges 44 and 46 arranged to be positioned in contact with the section 40 extending within the end of the casing 42 and the section 38 extending beyond the end of the casing. The flange 46 is positioned to be seated on the end of the casing 42 and a ring element 50, having an internal end flange 52 is threadably attached to the end of the casing 42 in a manner to engage the flange 52 of the ring element 50 with the external flange 44 of the section 38 to retain the housing in position on the casing.

The motor 20 is positioned in the section 46 in a recess 54 formed therein and is retained in the recess by engagement with the external flange 44 of the section 38 when the sections are assembled. The section 40 is provided with an electrical contact element 56 extending through the bottom of the section in position for contact with the central contact 58 of a flashlight cell in the battery casing 42, the contact 56 being also connected to the motor 20 by a conductor 60. The section 40 is also provided with a switch contact element 62 extending through the wall of the section and positioned to be engaged by the usual switch mechanism 64 of the casing 42 in a conventional manner, not shown. A conductor 66 connects the motor with the contact element 62, so that upon operation of the switch mechanism 64 the motor may be started or stopped as desired. Speed control mechanism for the motor 20 may also be provided, such as an adjustable rheostat, not shown, whereby the speed of the motor may be adjusted as desired.

The recess 54 of the section 40 of the motor housing is preferably shaped, as shown in FIGURE 4, to hold the motor centered in the housing, and so that the motor when in the recess will be engaged with the section 40 to hold the motor against rotation in the housing. By this arrangement the housing may be readily disassembled and the motor removed therefrom for purposes of replacement or repair.

The motor 20 has a shaft 68 which fits into one end of and is connected to a coil spring 72, as best seen in FIGURE 3, and a tubular element 74 extends into and is connected to the other end of the spring 72, so that the spring and tubular element will rotate with the shaft. The end of the flexible cable or wire 22 is extended into and attached to the tubular element 74, as by crimping the element into engagement with the wire or cable or by soldering the same thereto, to cause the cable or wire to be rotated upon operation of the motor to transmit power to the propeller 16 to rotate the propeller.

Within the section 28 a cross member 76 is positioned through which one end of a coil spring 78 extends through a central opening in the cross member, and this spring 78 extends at its other end beyond the section 38 axially thereof. The end of the flexible tube 24 is rotatably extended into the outer end portion of the spring 78 and the flexible cable or wire 22 also extends through the spring 78 whereby a flexible support is provided for the cable and tube where the same enter the motor housing to avoid sharp bending of the cable or tube close to the housing whereby breaking of the cable or tube due to such bending is prevented.

The flexible tube 24 may be provided with an enlarged head or tubular actuator member 80, shown in FIGURE 1, attached thereto, and which may be rotated by the operator to rotate the tube to control the movement of the aircraft in flight in a manner to be explained hereinafter.

The flexible tube 24 is extended into the fuselage or body 10, as seen in FIGURE 1, and extends out through the nose of the craft as previously described, and is also attached to one wing of the craft, as by means of a clip 82, illustrated in FIGURE 5, secured to the wing in any convenient manner as by means of a rivet 84 extending through aligned holes 86 in the clip is also provided with internal teeth or projections 88 positioned to grippingly engage the tube 24, whereby the tube is anchored to the wing to hold the tube against rotation relative to the wing.

The construction of the model airplane and the attachment of the flexible tube 24 thereto is preferably such that the center of gravity of the plane is forward of the center of lift provided by the wings, so that in flight the plane will have a tendency to nose down and remain on the ground. The attachment of the tube 24 to the wing of the craft outwardly from the fuselage also tends to lend lateral stability to the craft in flight.

In the operation of the invention the airplane may be placed on the ground preparatory to flight, the flashlight casing 42 being held in the hand of the operator, so that the motor 20 will be rotated to the right or clockwise as seen in FIGURE 1. Upon operation of the switch mechanism 64 the motor may then be started to rotate the cable or wire 22 in the tube 24 to rotate the propeller 16. Upon rotation of the propeller at sufficient speed the airplane will be propelled forward into flight in a counterclockwise direction as viewed from the ground. Due to the friction of the cable 22 in the tube 24 the tube will tend to rotate to the right or clockwise with the cable, thus tending to tilt the plane upwardly as the plane moves forward so that the plane flies upwardly at the start, and when in flight the cable and tube are extended and exert a lateral stabilizing effect on the plane tending to cause the craft to level off in flight and circle about at the limit of the extension of the cable and tube.

In practice the cable 22 may be of very light construction formed of strands of very fine wire and the tube 24 may be of small diameter, thin walled and formed of very light material, such as nylon. By so constructing the cable and tube and making the plane of light construction capable of flying at relatively low forward speeds, the plane may be made to extend the cable and tube and level off in flight.

In flight the movements of the plane may be controlled by opening and closing the switch 64 to regulate the speed of the motor 20 and by twisting the tube 24 manually to apply more or less torque to the tube in a direction to cause the plane to rise or descend or dive as may be desired. Upon opening the switch 64 the torque on the tube 24 due to rapid rotation of the cable in the tube is reduced and due to the adjustment of the center of gravity of the plane forwardly of the center of lift of the wings the plane descends automatically. The aircraft may also be put in flight by holding the tube 24 at a point to dangle or suspend the craft above the ground, and upon operation of the motor 20 the craft will immediately straighten up and level off in flight so that its movements may then be controlled by the operation of the motor and by twisting the tube 24.

It will thus be seen that the invention, constructed and operated as described above provides propulsion and control mechanism for captive model aircraft which is of simple design and strong construction and by which the speed of model aircraft as well as the movements of the same in flight may be easily and accurately controlled.

The invention has been disclosed herein in connection with a certain specific embodiment of the same, but it will be understood that this is intended by way of example only and that various changes can be made in the construction and arrangement of the parts within the spirit of the invention and the scope of the appended claims.

Having thus clearly shown and described the invention, what is claimed as new and desired to secure by Letters Patent is:

1. Propulsion and flight controlling mechanism for model aircraft of the type which is solely aerodynamically supported in flight and having wings extending laterally from the longitudinal axis thereof and a propeller rotatably mounted forwardly of the wings comprising an elongated, flexible, tubular member non-rotatively connected to one of said wings at a point spaced laterally from said axis to exert a rotative force on said wing upon rotation of the member about its longitudinal axis tending to change the vertical direction of flight of the aircraft and a force tending to hold the aircraft against lateral tilting movement in flight and extending to a location remote from said aircraft, an elongated, flexible, power transmitting element extending through and rotatable in said member and having a driving connection with the propeller to rotate the propeller upon rotation of the element and means under the control of an operator at said location for rotating said element.

2. Propulsion and flight controlling mechanism for model aircraft of the type which is solely aerodynamically supported in flight and having wings extending laterally from the longitudinal axis thereof and a propeller rotatably mounted forwardly of said wings, the center of gravity of said aircraft being located to cause the exertion of a gravitational force tending to rotate the aircraft forwardly and downwardly in flight, comprising an elongated, flexible, tubular member immovably anchored to one of said wings laterally outwardly from said axis at a point to exert a force thereon tending to rotate the aircraft rearwardly and upwardly upon the exertion of a torque on the member in a direction counter to the direction of said gravitational force and a force tending to hold the aircraft against lateral tilting movement in flight and extending to a location remote from said aircraft, an elongated, flexible power transmitting element extending through and rotatable in said member in frictional contact therewith to cause the exertion of a torque on said member in said counter direction upon rotation of the element in said counter direction and having a driving connection with said propeller to rotate the propeller with the element and means under the control of an operator at said location for rotating said element.

3. Propulsion and flight controlling mechanism for aircraft of the type which is solely aerodynamically supported in flight and having laterally extending wings and a propeller rotatably mounted on the aircraft forwardly of said wings, the center of gravity of said aircraft being located to cause the exertion of a gravitational force tending to rotate the aircraft forwardly and downwardly in flight, comprising an elongated, flexible member connected adjacent one end to the aircraft at a location to exert a rotative force thereon tending to cause the aircraft to change its direction of movement upwardly upon the exertion of a rotative force on the member to rotate the member about its longitudinal axis in a direction counter to the direction of said gravitational force and a force tending to hold the aircraft against lateral tilting movement in flight and extending to a location remote from said aircraft, the other end of said member being freely rotatable, an elongated, flexible, power transmitting element coextensive with said member and having a driving connection with said propeller to rotate the propeller upon rotation of the element and means under the control of an operator at said location for rotating said element.

4. Propulsion and flight controlling mechanism for aircraft of the type which is solely aerodynamically supported in flight and having laterally extending wings and a propeller rotatably mounted on the aircraft forwardly of said wings, the center of gravity of said aircraft being located to cause the exertion of a gravitational force tending to rotate the aircraft forwardly and downwardly in flight, comprising an elongated, flexible member connected adjacent one end to the aircraft at a location to exert a rotative force thereon tending to cause the aircraft to change its direction of movement upwardly upon the exertion of a rotative force on the member to rotate the member about its longitudinal axis in a direction counter to the direction of said gravitational force and a force on the aircraft tending to hold the aircraft against lateral tilting movement in flight and extending to a location remote from said aircraft, the other end of said member being freely rotatable, an elongated, flexible, power transmitting element extending through and rotatable in said member and frictionally engageable with the member throughout the length of the member to exert a rotational force on the member in said counter direction upon rotation of the element in said counter direction and means under the control of an operator at said location for rotating said element.

5. In a flying model aircraft of the type which is solely aerodynamically supported in flight and having laterally extending wings and a propeller rotatably mounted on the aircraft, the combination of an elongated, flexible, power transmitting element having a driving connection with the propeller to rotate the propeller upon rotation of said element, an elongated, flexible, solid walled tubular member surrounding said element attached to said aircraft at a point spaced laterally from the longitudinal axis of the aircraft to hold the element against rotation relative thereto and to cause the element to yieldingly hold the aircraft against lateral tilting movement in flight and to exert a rotative force on the aircraft about the lateral axis of the aircraft tending to change the vertical direction of flight of the aircraft upon rotational movement of the member about its axis, and means under the control of an operator for rotating said element.

6. In a flying model aircraft of the type which is solely aerodynamically supported in flight and having laterally extending wings and a propeller rotatably mounted on the aircraft, the combination of an elongated, flexible, power transmitting element having a driving connection with the propeller to rotate the propeller upon rotation of said element, an elongated, flexible, solid walled tubular member surrounding said element attached to said aircraft at a point spaced laterally from the longitudinal axis of the aircraft to yieldingly hold the aircraft against lateral tilting movement in flight and to cause the member to exert a rotational force on said aircraft about the lateral axis of said aircraft upon rotational movement of the member about its axis to change the direction of flight of the aircraft.

References Cited in the file of this patent
UNITED STATES PATENTS

| 1,802,139 | Dacey | Apr. 21, 1931 |
| 1,808,015 | Buchanan | June 2, 1931 |
| 1,852,340 | Vlahov | Apr. 5, 1932 |
| 2,420,510 | Wilson | May 13, 1947 |
| 2,676,014 | Smith | Apr. 20, 1954 |
| 2,688,821 | Bunting | Sept. 14, 1954 |
| 2,795,895 | Bortfeldt | June 18, 1957 |
| 2,837,864 | Bortfeldt | June 10, 1958 |